United States Patent [19]

Ricker et al.

[11] Patent Number: 4,926,099
[45] Date of Patent: May 15, 1990

[54] BIMODAL CONTROLLER FOR A MULTI-PHASE BRUSHLESS DC MOTOR

[75] Inventors: Dennis J. Ricker, Huber Heights; Richard L. Foster, Beavercreek, both of Ohio

[73] Assignee: General Motors Corporation, Detroit, Mich.

[21] Appl. No.: 334,417

[22] Filed: Apr. 7, 1989

[51] Int. Cl.$^5$ .............................................. H02P 6/02
[52] U.S. Cl. ..................................... 318/254; 318/138
[58] Field of Search ............... 368/254, 138, 439, 811, 368/599, 289

[56] References Cited

U.S. PATENT DOCUMENTS

| | | | |
|---|---|---|---|
| 3,946,292 | 3/1976 | Tanikoshi | 318/254 |
| 4,161,022 | 7/1979 | Kanazawa et al. | 363/128 |
| 4,544,886 | 10/1985 | Murty | 318/254 |
| 4,677,356 | 6/1987 | Tsuneda et al. | 318/254 |
| 4,680,515 | 7/1987 | Crook | 318/254 |
| 4,740,734 | 4/1988 | Takeuchi et al. | 318/254 |
| 4,748,387 | 5/1988 | Tanuma et al. | 318/254 |
| 4,763,049 | 8/1988 | Magee | 318/254 |

*Primary Examiner*—Bernard Roskoski
*Attorney, Agent, or Firm*—Mark A. Navarre

[57] ABSTRACT

A controller for a multi-phase brushless DC motor which is selectively operable in either full wave or half wave modes for maximizing either the output torque or output speed, respectively, of the motor. One terminal of each phase winding is connected to the terminals of a DC voltage source via upper and lower legs of a full wave bridge circuit, while the other winding terminals are mutually connected to a common terminal which is selectively isolated from or returned to a terminal of the source. When relatively high motor output torque is required to drive a relatively heavy load, the winding common terminal is isolated from the source and the bridge circuit is operated in the full wave mode to energize the motor windings with bidirectional current. When load to be driven is relatively light and higher motor speed is desired, the winding common terminal is connected to a terminal of the source and the bridge circuit is operated in the half wave mode to energize the motor windings with unidirectional current.

1 Claim, 2 Drawing Sheets

BIMODAL CONTROLLER FOR A MULTI-PHASE BRUSHLESS DC MOTOR

This invention relates to the control of a multi-phase brushless DC motor and more particularly to a motor controller which selectively maximizes either the speed or torque characteristics of the motor.

BACKGROUND OF THE INVENTION

In a multi-phase brushless DC motor, the rotary field is established by a set of permanent magnets secured to the rotor and the stationary field is established by sequentially energizing a set of phase windings secured on the stator. A position or EMF sensing device detects the position of the rotor and a logic circuit energizes the stator windings relative to the detected position of the rotor to accelerate the rotor in the clockwise (CW) or counterclockwise (CCW) direction of rotation.

The motor phase windings may be energized with either bidirectional current (via a full wave bridge) or unidirectional current (via a half wave bridge) depending on the speed and torque characteristics desired for the particular application. With a full wave bridge two or more of the windings are always active (energized); this maximizes the motor output torque for driving relatively high loads, but at a relatively low motor speed. With a half wave bridge, the applied voltage is greater and the number of active windings at any point in time is reduced, as compared to the full wave example; this maximizes the motor speed for driving relatively light loads where high motor output torque is not required.

SUMMARY OF THE PRESENT INVENTION

The present invention is directed to an improved controller for a multi-phase brushless DC motor where the controller is selectively operable in either full wave or half wave modes for maximizing either the output torque or output speed of the motor. One terminal of each phase winding is connected to the terminals of a DC voltage source via the upper and lower legs of a full wave bridge circuit, while the other winding terminals are mutually connected to a common terminal C which is selectively isolated from or returned to a terminal of the source.

When relatively high motor output torque is required to drive a relatively heavy load, the winding common terminal is isolated from the source and the bridge circuit is operated in the full wave mode to energize the motor windings with bidirectional current. When load to be driven is relatively light and higher motor speed is desired, the winding common terminal is connected to a terminal of the source and the bridge circuit is operated in the half wave mode to energize the motor windings with unidirectional current. The control of this invention is thus capable of selectively producing substantially different motor performance characteristics to suit the requirements of the particular application.

Significantly, the controller of this invention is especially well suited to control applications in which the load varies from heavy to light and relatively fast movement is desired in the light load condition. A motor operated automotive anti-lock braking system is one such system. When the motor is operated in a direction to increase the brake pressure, the load can be relatively heavy and the controller is operated in the full wave mode to maximize the motor output torque. When the motor is operated in a direction to reduce the brake pressure, the load is relatively light and high motor speed is desired; here, the controller is operated in the half wave mode to maximize the motor speed.

DETAILED DESCRIPTION OF THE DRAWINGS

Figure 1:
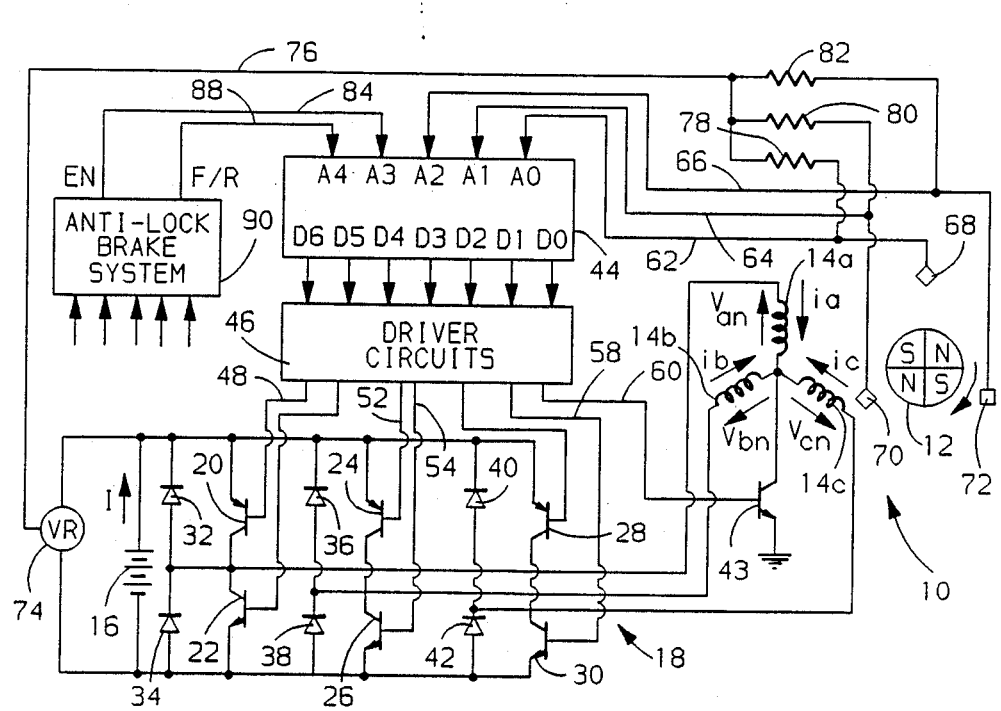
FIG. 1 is a block diagram of a three-phase brushless DC motor and the controller of this invention.

Referring first to FIG. 1, the reference numeral 10 generally designates a brushless DC motor comprising a permanent magnet rotor 12 and three stator windings 14a, 14b and 14c. The stator windings 14a, 14b and 14c are mutually connected at one end to a common terminal C and individually connected at their other ends to the storage battery 16 via upper and lower transistors of a full wave bridge 18. Thus, the winding 14a is connected to the battery 16 via the upper and lower bridge transistors 20 and 22; the winding 14b is connected to the battery 16 via the upper and lower bridge transistors 24 and 26; and the winding 14c is connected to the battery 16 via the upper and lower bridge transistors 28 and 30. The freewheeling diodes 32, 34, 36, 38, 40, 42 are connected across the emitter-collector circuits of the bridge transistors 20, 22, 24, 26, 28, 30 for circulating inductive energy at deenergization of the respective stator windings.

The transistor 43 is connected between the winding common terminal C and the negative (grounded) terminal of storage battery 16. When transistor 43 is nonconductive, the common terminal C is electrically isolated from the battery 16 and the bridge 18 can be operated in a full wave mode to produce maximum motor output torque. When transistor 43 is conductive, the common terminal C is electrically connected to battery 16 and the upper transistors 20, 24 and 28 of bridge 18 can be operated in a half wave mode to produce maximum motor output speed.

The common grounding transistor 43 and the bridge transistors 20, 22, 24, 26, 28 and 30 are controlled by the Read-Only Memory ROM 44 data outputs D0–D6 via driver circuit 46 and lines 60, 48, 50, 52, 54, 56 and 58, respectively. In full wave operation, the data line D0 is maintained at a logic zero to bias transistor 43 nonconductive and pairs of the data lines D1, D2, D3, D4, D5 and D6 sequentially alternate between logic zero and logic one to effect bidirectional energization of the stator windings 14a, 14b and 14c. In half wave operation, the data line D0 is maintained at a logic one to bias transistor 43 conductive, the data lines D1, D3 and D5 are maintained at a logic zero potential to bias the lower bridge transistors 22, 26 and 30 nonconductive, and the data lines D2, D4 and D6 sequentially alternate between logic zero and logic one to effect unidirectional energization of the stator windings 14a, 14b and 14c.

The logic level present at the data lines D0–D6 of ROM 44, and hence, the motor winding energization pattern, is controlled as a function of the logic level of the five ROM address inputs A0–A4. The inputs A0, A1 and A2 are obtained directly via lines 62, 64 and 66 from the sensors 68, 70 and 72. The sensors 68, 70 and 72 are situated 120 electrical degrees apart in the magnetic field of rotor 12 and provide an indication of the rotor position. In the illustrated embodiment, the sensors 68, 70 and 72 are of the Hall effect type; however, sensors of another type or any rotor position encoder or EMF sensing arrangement could be used. The sensors 68, 70 and 72 are normally in a high impedance state and toggle to a low impedance (logic zero) state when the rotor 12 is in a predetermined position. The lines 62, 64 and 66 are connected via resistors 78, 80 and 82 to the output line 76 of voltage regulator 74 to establish a normally high logic potential at the address inputs A0, A1 and A2.

In the illustrated embodiment, the inputs A3 and A4 of ROM 44 are externally generated by an anti-lock braking system, designated by the block 90. In such a system, the motor 10 is connected to drive a hydraulic apparatus for alternately building and releasing hydraulic fluid pressure for an automotive braking system. The brake system 90 generates an enable (EN) signal on line 84 for ROM address line A3 to turn the motor 10 on or off, and a forward/reverse (F/R) signal on line 88 for ROM address line A4 to designate the desired direction of motor rotation. For the purpose of this disclosure, it will be assumed (1) that the hydraulic load cannot back-drive the rotor 12 when the motor windings 14a–14c are deenergized, (2) that high torque full wave operation is desired in the forward direction of motor rotation, and (3) that high speed half wave operation is desired in the reverse direction of motor rotation.

Figure 2:
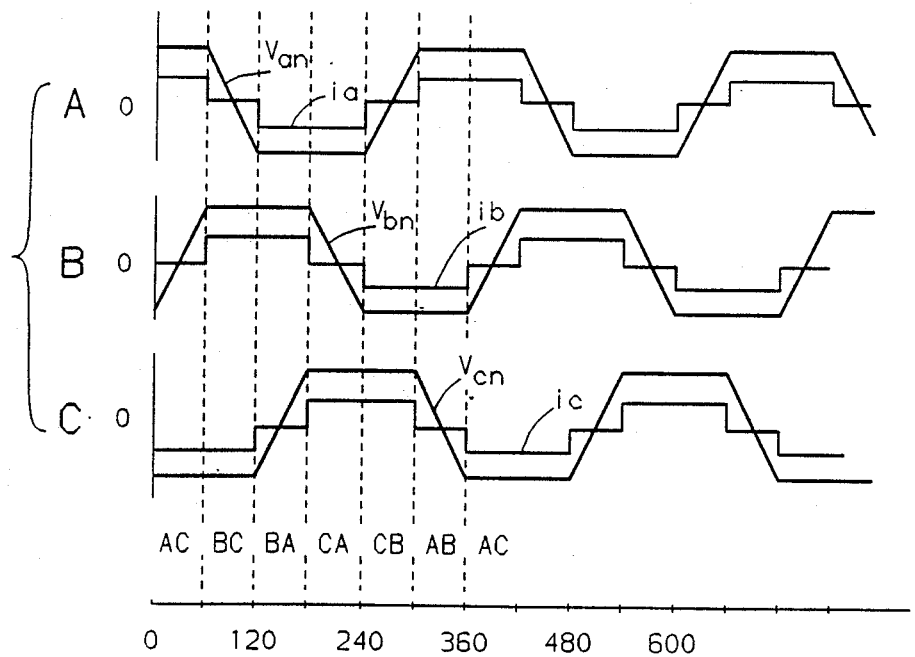
FIGS. 2 and 3 depict the voltage and current waveforms for the motor phase windings in the full wave and half wave modes of operation, respectively.

FIG. 2 depicts idealized voltage and current waveforms for the phase windings 14a–14c as a function of rotor position in electrical degrees during forward motor rotation in the full wave mode. Graph A depicts the line-to-common phase voltage $V_{an}$ and phase current ia for the phase winding 14a; Graph B depicts the line-to-common phase voltage $V_{bn}$ and phase current $i_b$ for the phase winding 14b; and Graph C depicts the line-to-common phase voltage $V_{cn}$ and phase current $i_c$ for the phase winding 14c.

Since two bridge transistors are always conductive, six different stator winding energization patterns are possible, such patterns being designated as AC, AB, CA, CB, BA and BC. The first designation letter refers to the stator winding (14a, 14b or 14c) connected through a bridge transistor to the positive terminal of battery 16, and the second letter designation refers to a stator winding connected through a bridge transistor to the negative (grounded) terminal of battery 16. Each stator winding energization pattern produces a distinct stator magnetic field, and the conduction of the various bridge transistors is controlled by ROM 44 and the rotor position sensors 68, 70, 72 such that the magnetic axis of the stator maintains a predetermined relationship with respect to the magnetic axis of the rotor 12.

More particularly, the stator winding energization patterns are selected so that the magnetic axis of the stator leads the rotor field axis by between 60 and 120 electrical degrees, the motor torque thereby produced being maximum when the phase difference is 90 electrical degrees. The information for maintaining this sequence is obtained from the rotor position sensors 68, 70 and 72 which, due to their orientation with respect to the rotor magnetic field, indicate six distinct regions of rotor position. If the forward direction of motor rotation is defined as being clockwise (CW), the correct stator winding energization sequence pattern is AC, BC, BA, CA, CB and AB. Each such stator winding energization pattern is maintained for 60 electrical degrees of rotor rotation as indicated in FIG. 2 and the patterns taken together occupy 360 electrical degrees or one complete cycle.

Reverse motor rotation is obtained by providing the opposite stator winding energization pattern for a given rotor position. Thus the stator winding energization pattern sequence for reverse motor rotation is CA, BA, BC, AC, AB and CB.

Figure 3:
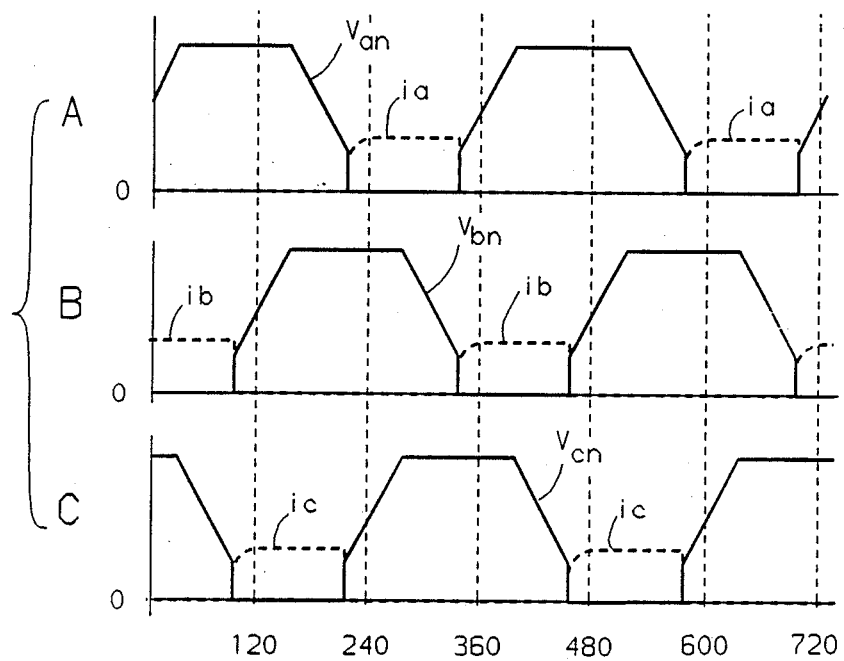

FIG. 3 depicts idealized voltage and current waveforms for the phase windings 14a–14c as a function of rotor position in electrical degrees during forward motor rotation in the half wave mode. As in FIG. 2, Graph A depicts the line-to-common phase voltage $V_{an}$ and phase current $i_a$ for the phase winding 14a, Graph B depicts the line-to-common phase voltage $V_{bn}$ and phase current $i_b$ for the phase winding 14b, and Graph C depicts the line-to-common phase voltage $V_{cn}$ and phase current $i_c$ for the phase winding 14c. In this case, however, the common terminal C is maintained substantially at ground potential.

In half wave operation, the phase windings 14a–14c are simply energized in sequence based on rotor position, as shown in FIG. 3. The sequence A, B, C is produced for forward motor rotation, while the sequence C, B, A is produced for reverse motor rotation.

The winding energization sequence actually produced by ROM 44 depends on the state of the address input A4. So long as the address input A4 is maintained at a logic one potential, ROM 44 will produce a full wave winding energization pattern in the forward sequence; so long as the address input A4 is maintained at a logic zero potential, ROM 44 will produce a half wave winding energization pattern in the reverse sequence.

The EN (A3) input of ROM 44 is used to alternately enable or disable energization of the motor windings. So long as the address input A3 is maintained at a logic one potential, ROM 44 will produce the appropriate winding energization patterns as described above. However, when the address input A4 is maintained at a logic zero potential, the data line outputs of ROM 44 will bias the common grounding transistor 43 and all of the bridge transistors 20, 22, 24, 26, 28 and 30 nonconductive. Alternately, the EN input could be pulsed high and low during the on periods of motor 10 to modulate the motor winding energization, if desired.

Figure 4:
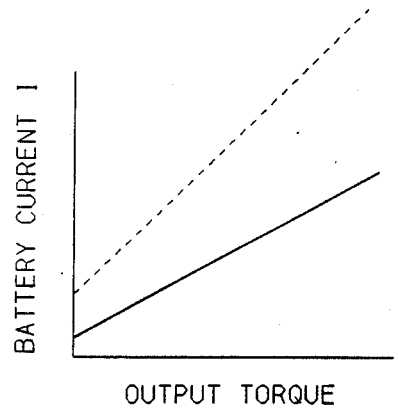
FIG. 4 depicts the motor current v. motor torque characteristics for the full wave and half wave modes of operation.
Figure 5:
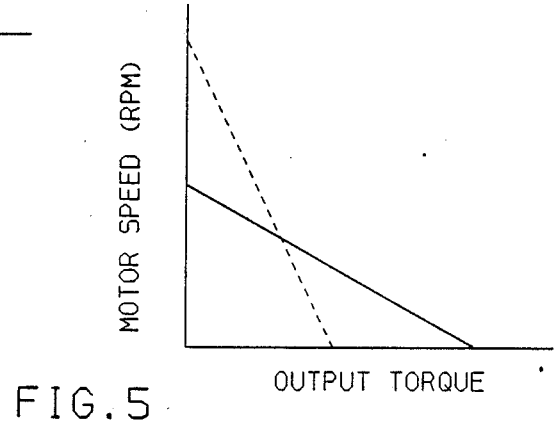
FIG. 5 depicts the motor speed v. motor torque characteristics for the full wave and half wave modes of operation.

FIGS. 4 and 5 compare the operating characteristics of motor 10 during the full wave and half wave modes. FIG. 4 depicts the bridge or battery current I as a function of motor output torque, and FIG. 5 depicts the motor speed as a function of motor output torque. In each case, the half wave characteristic is designated by the broken trace, and the full wave characteristic is designated by the solid trace.

Referring to FIG. 4, it will be seen that the torque per unit current of the full wave motor is substantially greater than that of the half wave motor. Since, as a practical matter, the motor current is limited in relation to the size of the stator windings, the torque capability of the full wave motor clearly exceeds that of the half wave motor. In practice, the torque advantage may be on the order of 2:1.

Referring to FIG. 5, it will be seen that the speed of rotation of the half wave motor is significantly greater than that of the full wave motor for any given level of output torque. In practice, the speed advance may be on the order of 2:1.

A brushless DC motor controlled according to this invention is thus capable of exhibiting two different performance characteristics depending upon whether half wave or full wave operation is selected. The desired mode may be selected in advance to suit a particular application, or as in the illustrated embodiment, in the course of the control depending on system requirements. It should be recognized that various other modifications to the illustrated embodiment will occur to those skilled in the art, and that control systems incorporating such modifications may fall within the scope of this invention which is defined by the appended claims.

The embodiments of the invention in which an exclusive property or privilege is claimed are defined as follows:

1. In a brushless DC motor control system including a rotor, N motor stator windings mutually connected to a common terminal, and stator winding energization means having first and second sets of N transistors adapted to connect said stator windings to first and second terminals, respectively, of a source of direct current, control apparatus comprising:

common switch means effective when activated to connect the common terminal of said stator windings to the first terminal of said source, and when deactivated to disconnect said common terminal from said source;

control means effective (1) in a high torque, low speed mode of operation to deactivate said common switch means and to control said first and second sets of transistors in relation to the position of said rotor to effect full wave energization of said stator windings, and (2) in a high speed, low torque mode of operation to activate said common switch means, to disable said first set of transistors, and to control said second set of transistors in relation to the position of said rotor to effect half wave energization of said stator windings.

* * * * *